US012758914B2

(12) United States Patent
Baeck et al.

(10) Patent No.: US 12,758,914 B2
(45) Date of Patent: Oct. 13, 2026

(54) NANOFIBER FILTER AND METHOD FOR MANUFACTURING SAME

(71) Applicant: LG ELECTRONICS INC., Seoul (KR)

(72) Inventors: Seungjae Baeck, Seoul (KR); Okchun Hyun, Seoul (KR); Yanghwa Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 294 days.

(21) Appl. No.: 18/717,373

(22) PCT Filed: Nov. 2, 2022

(86) PCT No.: PCT/KR2022/016982
§ 371 (c)(1),
(2) Date: Jun. 6, 2024

(87) PCT Pub. No.: WO2023/120958
PCT Pub. Date: Jun. 29, 2023

(65) Prior Publication Data
US 2024/0408531 A1 Dec. 12, 2024

(30) Foreign Application Priority Data
Dec. 20, 2021 (KR) ........................ 10-2021-0182897

(51) Int. Cl.
*B01D 39/16* (2006.01)
*B01D 46/00* (2022.01)
(Continued)

(52) U.S. Cl.
CPC ......... *B01D 46/546* (2013.01); *B01D 39/163* (2013.01); *B01D 46/0001* (2013.01);
(Continued)

(58) Field of Classification Search
CPC ................ B01D 46/546; B01D 39/163; B01D 46/0001; B01D 46/0047; B01D 46/523; B01D 2239/025; B01D 2239/0613; B01D 2239/0618; B01D 2239/0631; B01D 2239/0654; B01D 2239/10; B01D 2265/04; B01D 2275/10; B01D 2239/069;
(Continued)

(56) References Cited

U.S. PATENT DOCUMENTS 8,329,034 B2 * 12/2012 Waller, Jr. ............ B01D 67/009
210/500.21
2006/0137318 A1 6/2006 Lim et al.
(Continued)

FOREIGN PATENT DOCUMENTS

EP 1 970 111 A1 9/2008
KR 10-2010-0104833 A 9/2010
(Continued)

*Primary Examiner* — Frank M Lawrence, Jr.
(74) *Attorney, Agent, or Firm* — Birch, Stewart, Kolasch & Birch, LLP

(57) ABSTRACT

A nanofiber filter may include a pleated base; and a nanofiber attached to the base by electrospinning. The nanofiber may be attached onto the base while the pleated base is in a flattened state. A method for manufacturing the nanofiber filter is also provided.

15 Claims, 12 Drawing Sheets

(51) Int. Cl.

| | |
|---|---|
| ***B01D 46/52*** | (2006.01) |
| ***B01D 46/54*** | (2006.01) |
| ***D01D 5/00*** | (2006.01) |
| ***D04H 1/4374*** | (2012.01) |
| ***D04H 1/4382*** | (2012.01) |
| ***D04H 1/60*** | (2006.01) |
| ***D04H 1/728*** | (2012.01) |
| ***D06J 1/02*** | (2006.01) |

(52) U.S. Cl.
CPC ....... *B01D 46/0047* (2013.01); *B01D 46/523* (2013.01); *D01D 5/0038* (2013.01); *D01D 5/0084* (2013.01); *D04H 1/4374* (2013.01); *D04H 1/43838* (2020.05); *D04H 1/60* (2013.01); *D04H 1/728* (2013.01); *D06J 1/02* (2013.01); *B01D 2239/025* (2013.01); *B01D 2239/0613* (2013.01); *B01D 2239/0618* (2013.01); *B01D 2239/0631* (2013.01); *B01D 2239/0654* (2013.01); *B01D 2239/10* (2013.01); *B01D 2265/04* (2013.01); *B01D 2275/10* (2013.01); *D10B 2505/04* (2013.01)

(58) Field of Classification Search
CPC .............. B01D 46/521; B01D 39/1623; B01D 2239/083; B01D 2273/30; B01D 46/52; D01D 5/0038; D01D 5/0084; D04H 1/4374; D04H 1/43838; D04H 1/60; D04H 1/728; D06J 1/02; D10B 2505/04
USPC .................................. 55/467, 497, 499, 501
See application file for complete search history.

(56) References Cited

U.S. PATENT DOCUMENTS

| | | | | |
|---|---|---|---|---|
| 2007/0084786 | A1* | 4/2007 | Smithies | B01D 39/18 55/486 |
| 2009/0120048 | A1* | 5/2009 | Wertz | B01D 39/1623 55/522 |
| 2010/0326028 | A1 | 12/2010 | Sundet | |
| 2014/0265009 | A1* | 9/2014 | Schaffitzel | B29C 43/226 264/171.13 |
| 2017/0016146 | A1 | 1/2017 | Takahashi | |
| 2019/0201816 | A1 | 7/2019 | Ho et al. | |
| 2021/0060456 | A1* | 3/2021 | Rahmathullah | B01D 39/16 |

FOREIGN PATENT DOCUMENTS

| | | | |
|---|---|---|---|
| KR | 10-2019-0021061 | A | 3/2019 |
| KR | 10-2020-0137668 | A | 12/2020 |
| KR | 10-2270152 | B1 | 6/2021 |
| WO | WO 2014/126928 | A1 | 8/2014 |

* cited by examiner

NANOFIBER FILTER AND METHOD FOR MANUFACTURING SAME

CROSS REFERENCE TO RELATED APPLICATIONS

This application is the National Phase of PCT International Application No. PCT/KR2022/016982, filed on Nov. 2, 2022, which claims priority under 35 U.S.C. 119 (a) to Patent Application No. 10-2021-0182897, filed in the Republic of Korea on Dec. 20, 2021, all of which are hereby expressly incorporated by reference into the present application.

TECHNICAL FIELD

The present disclosure relates to a nanofiber filter and a method for manufacturing the same.

BACKGROUND ART

An air purifier is a device that purifies indoor polluted air and improves the quality of the indoor air. Generally, the air purifier is provided with a filter that filters out microscopic substances such as fine dust, bacteria, or viruses floating in the air.

For example, the filter may be a nanofiber filter manufactured by an electrospinning device. The nanofiber filter has a pleated shape, so a surface area thereof may be increased, and as a result, collection efficiency thereof may be improved. In the conventional nanofiber filter, pleats were formed through a bending device and a heat treatment device.

However, the conventional nanofiber filter may suffer physical damage or thermal damage to a nanofiber layer during the process of forming the above pleats. In addition, such damage to the nanofiber layer reduces the durability of the filter and the dust collection efficiency of the filter.

DISCLOSURE

Technical Problem

The present disclosure is intended to solve the above problems and other problems.

Another objective of the present disclosure is to propose a filter in which damage to a nanofiber layer is prevented during the process of forming pleats in the nanofiber filter and a method of manufacturing the same.

Still another objective of the present disclosure is to propose a filter in which a nanofiber is able to be uniformly distributed on a base and a method for manufacturing the same.

Still another objective of the present disclosure is to propose a filter in which the area of a nanofiber attached to the base is able to be maximized and a method of manufacturing the same.

Technical Solution

In order to accomplish the above objectives or other objectives, according to one aspect of the present disclosure, a nanofiber filter includes: a base having a pleated shape; and a nanofiber attached on the base by electrospinning, wherein the nanofiber is attached on the base while the base having the pleated shape is in a flattened state.

According to another aspect of the present disclosure, a method for manufacturing the nanofiber filter includes: (a) forming pleats on the base; (b) flattening the pleated base by applying tension to the pleated base; (c) attaching the nanofiber on the flattened base by electrospinning; and (d) releasing the tension applied to the flattened base.

Advantageous Effects

The effects of the nanofiber filter and the method for manufacturing the same according to the present disclosure will be described as follows.

According to at least one of embodiments of the present disclosure, a filter in which damage to a nanofiber layer is prevented during the process of forming pleats in the nanofiber filter and a method of manufacturing the same may be provided.

According to at least one of embodiments of the present disclosure, a filter in which the nanofiber is able to be uniformly distributed on the base and a method for manufacturing the same may be provided.

According to at least one of embodiments of the present disclosure, a filter in which the area of the nanofiber attached to the base is able to be maximized and a method of manufacturing the same may be provided.

Additional scope of applicability of the present disclosure will become apparent from the detailed description below. However, since various changes and modifications within the spirit and scope of the present disclosure may be clearly understood by those skilled in the art, detailed description and a specific embodiment, such as the exemplary embodiment of the present disclosure, should be understood as given only as an example.

MODE FOR INVENTION

Figure 1:
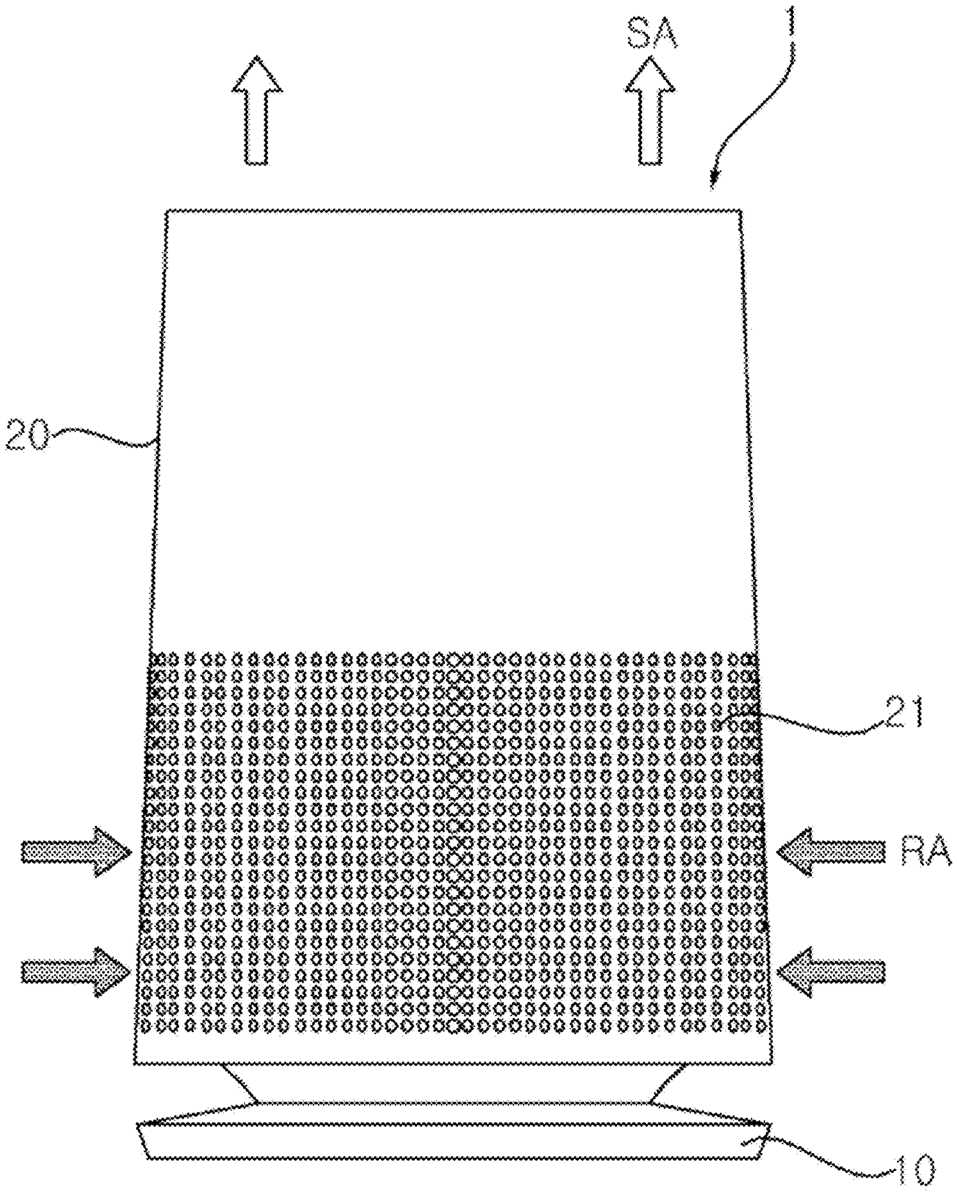
FIG. 1 is a front view of an air purifier having a filter according to an embodiment of the present disclosure.

Hereinafter, an embodiment disclosed in the present specification will be described in detail with reference to the attached drawings. However, identical or similar components will be assigned the same reference numbers regardless of reference numerals, and duplicate descriptions thereof will be omitted.

The terms "module" and "part" for components used in the following description are given or used interchangeably only for the ease of preparing the specification, and do not have distinct meanings or roles in themselves.

Additionally, in describing the embodiment disclosed in this specification, if it is determined that detailed descriptions of related known technologies may obscure the gist of the embodiment disclosed in this specification, the detailed descriptions will be omitted. In addition, the attached drawings are only for easy understanding of the embodiment disclosed in this specification, and the technical idea disclosed in this specification is not limited by the attached drawings, and this specification should be understood to include modifications, equivalents or substitutes included in the spirit and technical scope of the present disclosure are not limited.

Terms including ordinal numbers, such as first, second, etc., may be used to describe various components, but the components are not limited by the terms. The terms are used only for the purpose of distinguishing one component from another.

When one component is said to be "connected" or "coupled" to another component, it should be understood that the one component may be directly connected or coupled to the other component, but that other components may exist therebetween. On the other hand, it should be understood that when it is mentioned that one component is "directly connected" or "directly coupled" to another component, there is no component therebetween.

Singular expressions include plural expressions unless the context clearly dictates otherwise.

In the following description, although the embodiment is described with reference to specific drawings, if necessary, reference numerals not appearing in the specific drawings may be mentioned, and the reference numbers not appearing in the specific drawings may be used when the reference numbers appear in the other figures.

Referring to FIG. 1, the air purifier 1 may include a base 10 and a casing 20. The air purifier 1 may be referred to as an air conditioner.

For example, the base 10 may have an overall circular plate shape and support components of the air purifier 1. For example, the casing 20 may have an overall truncated cone shape.

A plurality of suction holes 21 may be formed on a portion of the side surface of the casing 20 and may allow room air RA to be provided into the casing 20. For example, the plurality of suction holes 21 may be adjacent to the lower end of the casing 20 and may be formed along the circumference of the casing 20.

A discharge hole 22 (see FIG. 2) may be formed in the upper surface of the casing 20, and supplying air SA purified by passing through the air purifier 1 may be provided indoors.

Figure 2:
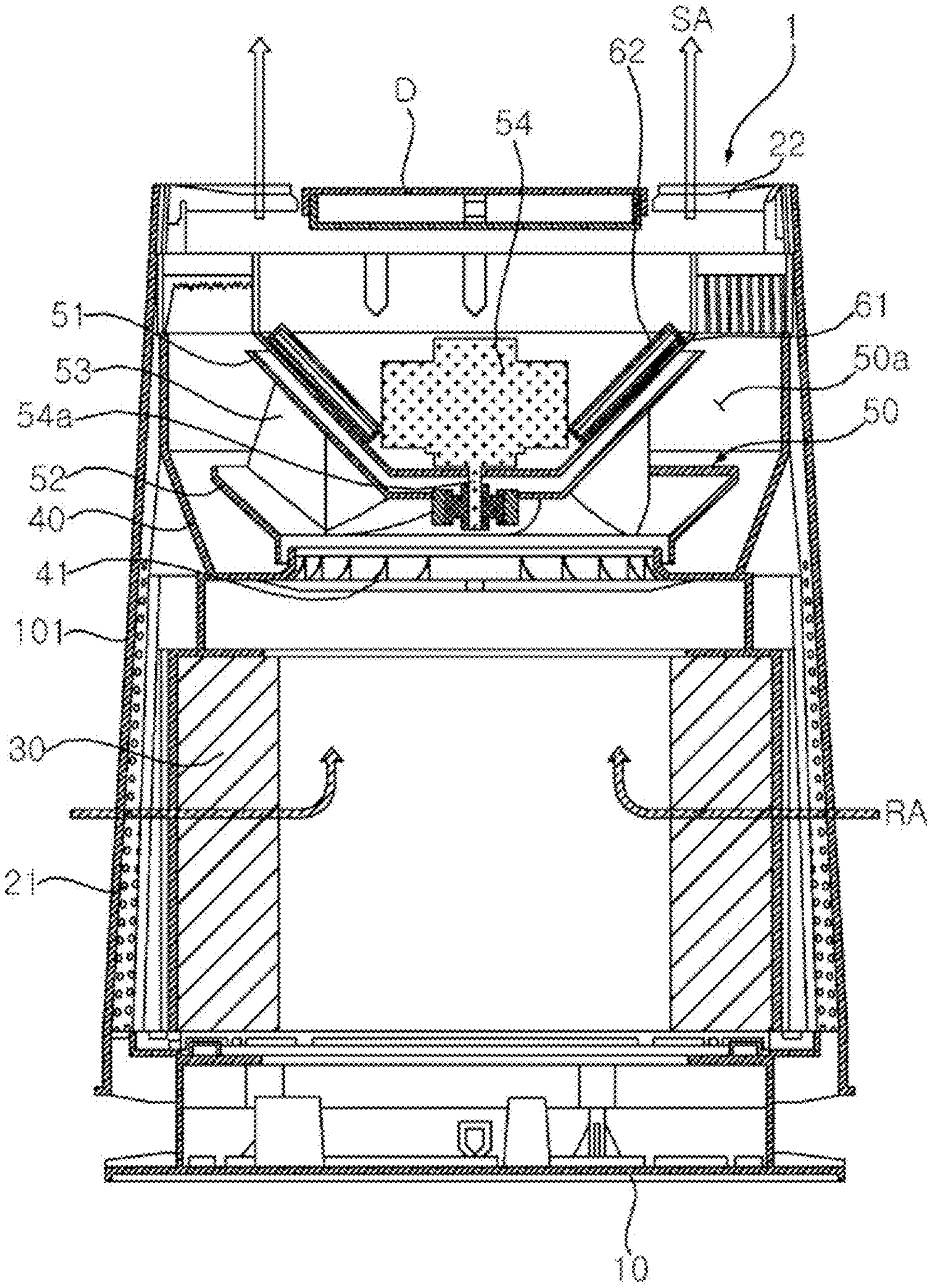
FIG. 2 is a cross-sectional view of the air purifier illustrated in FIG. 1.

Referring to FIG. 2, the air purifier 1 may include a filter assembly 30 and a fan module 50. The filter assembly 30 may be installed inside the casing 20 to be adjacent to the suction holes 21 and will be described in more detail later.

The fan module 50 may be installed inside the casing 20 and may be located at the upper side of the filter assembly 30. The fan module 50 may be installed in a fan housing 40 that is fixed to the inside of the casing 20. The fan module 50 may cause an air flow from the suction holes 21 to the discharge hole 22. In this case, air may be introduced into the fan module 50 through an introduction part 41 of the fan housing 40.

Specifically, the fan module 50 may include a hub 51, a shroud 52, a plurality of blades 53, and a motor 54. The motor 54 may be an electric motor. The hub 51 may be fixed to a rotating shaft 54*a* of the motor 54, and the shroud 52 may be spaced apart from the hub 51. The plurality of blades 53 may be arranged between the hub 51 and the shroud 52 and may be rotated according to the power of the motor 54 to cause an air flow.

Meanwhile, a display part D may be installed on the top of the air purifier 1. For example, the display part D may display information such as the operation information of the air purifier 1 or an indoor air temperature, humidity, fine dust concentration, or harmful gas concentration.

Figure 3:
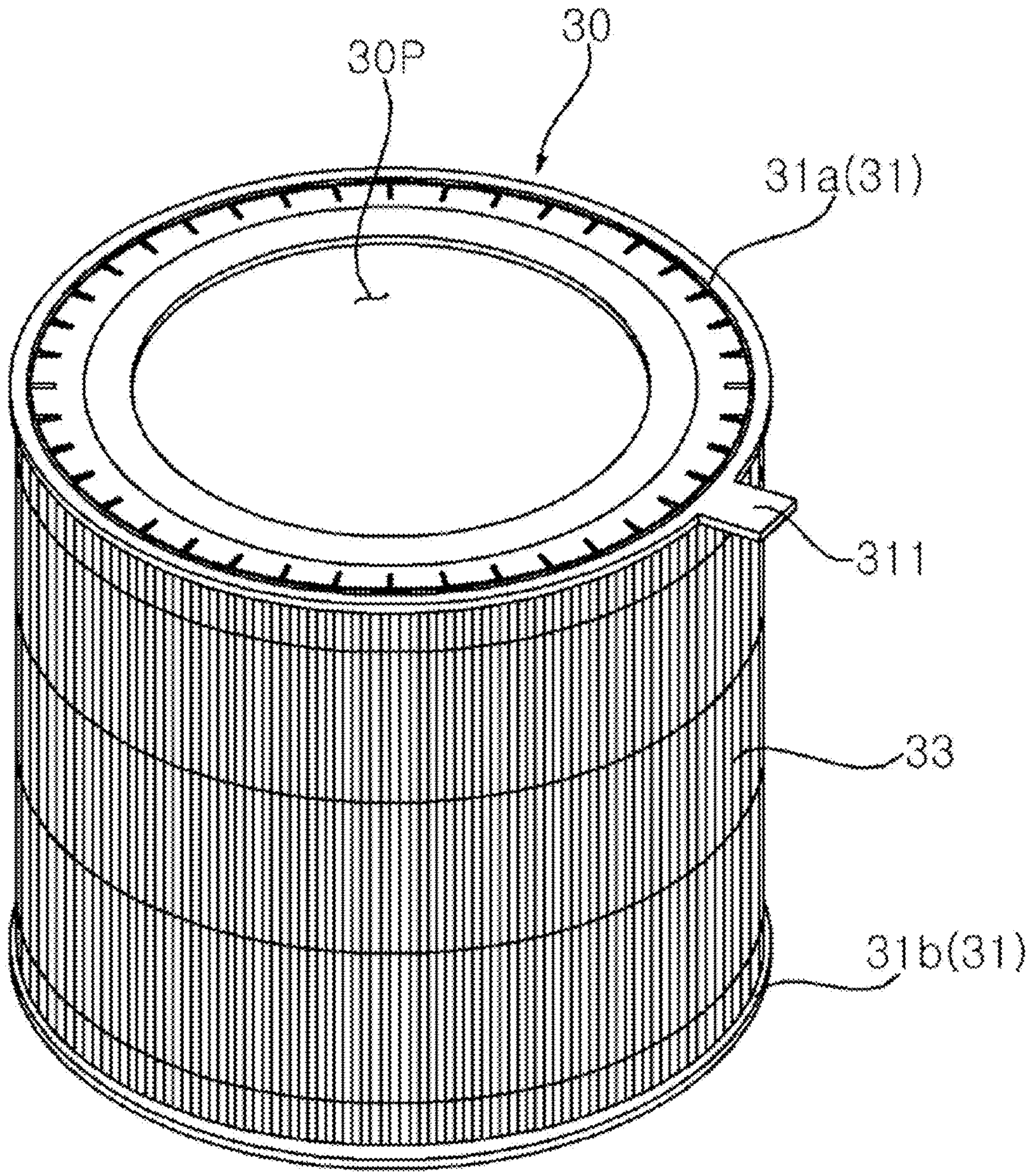
FIG. 3 is a perspective view of a filter assembly according to the embodiment of the present disclosure.

Referring to FIGS. 2 and 3, the filter assembly 30 may have an overall cylindrical shape and may be open up and down. However, the shape of the filter assembly 30 is not limited thereto, and may have various shapes such as quadrangular and circular shapes. The filter assembly 30 may be briefly referred to as a filter 30. In response to the operation of the motor 54, room air RA passing through the suction holes 21 may be purified by flowing from the outer circumferential surface of the filter assembly 30 to the inner circumferential surface thereof, and may be provided through an internal space 30P of the filter assembly 30 to the fan module 50. The air passing through the fan module 50 may be supplied indoors as supplying air SA through the discharge hole 22.

A frame 31 may be coupled to the upper and lower ends of the filter assembly 30 and may function as a supporter for the filter assembly 30. A first upper frame 31*a* may have a ring shape and may be coupled to the upper end of the filter assembly 30. A first lower frame 31*b* may have a ring shape and may be coupled to the lower end of the filter assembly 30.

Meanwhile, a strap 311 may be provided on one side of the first upper frame 31*a*. In this case, a user may hold the strap 311 and withdraw the filter assembly 30 from the casing 20.

Figure 4:
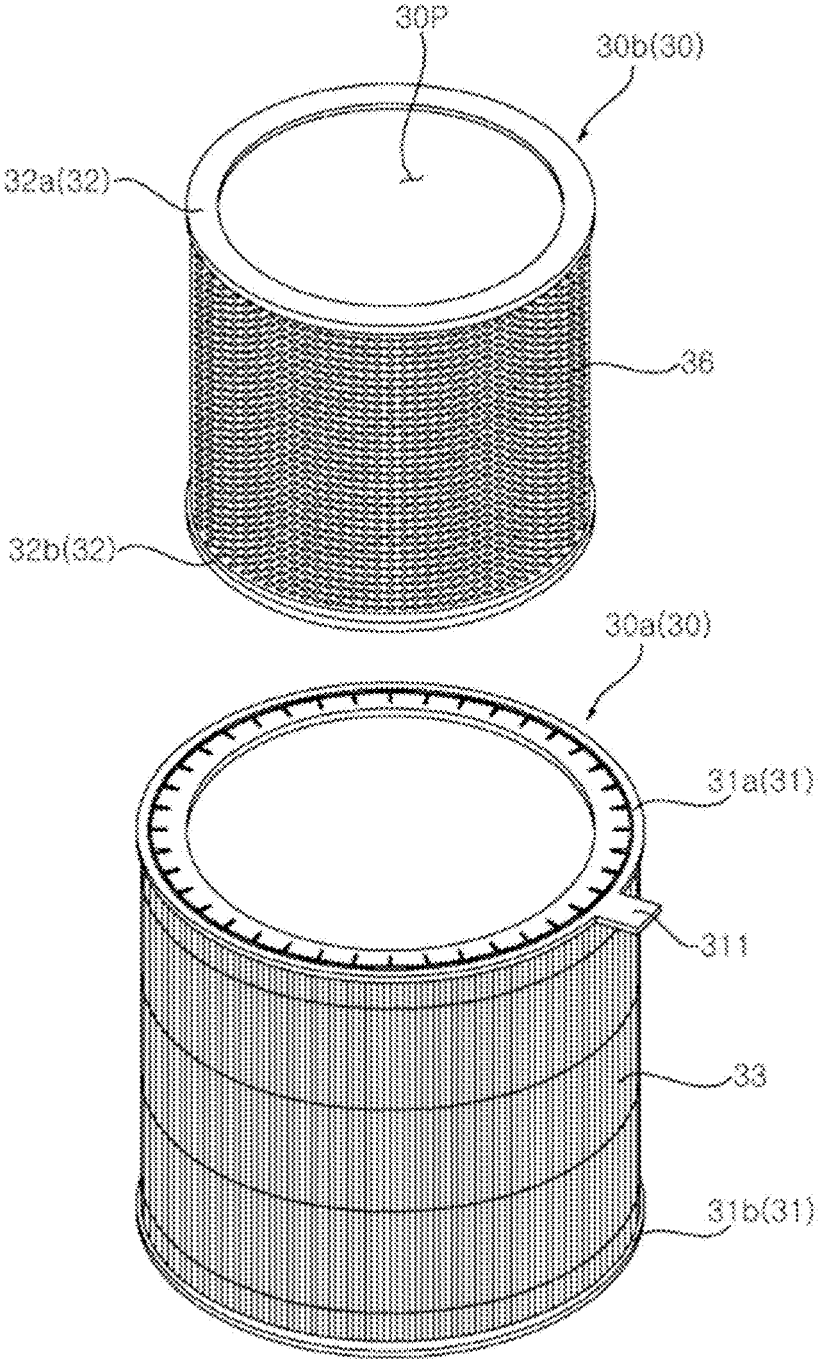
FIG. 4 is an exploded perspective view of the filter assembly illustrated in FIG. 3.

Referring to FIG. 4, the filter assembly 30 may include a first assembly 30*a* and a second assembly 30*b*. The first assembly 30*a* may constitute the exterior of the filter assembly 30, and the second assembly 30*b* may be inserted into the first assembly 30*a*. The internal space 30P of the filter assembly 30 may be defined inside the second assembly 30*b*.

The first upper frame 31*a* may be coupled to the upper end of the first assembly 30*a*, and the first lower frame 31*b* may be coupled to the lower end of the second assembly 30*b*.

A prefilter 33 may be located between the first upper frame 31*a* and the first lower frame 31*b* and may be coupled to the first upper frame 31*a* and the first lower frame 31*b*. Accordingly, the prefilter 33 may be supported by the first upper frame 31*a* and the first lower frame 31*b*, and the roll shape of the prefilter 33 may be maintained.

A second upper frame 32*a* may be coupled to the upper end of the second assembly 30*b*, and a second lower frame 32*b* may be coupled to the lower end of the second assembly 30*b*.

A deodorizing filter 36 may be located between the second upper frame 32*a* and the second lower frame 32*b* and may be coupled to the second upper frame 32*a* and the second lower frame 32*b*. Accordingly, the deodorizing filter 36 may be supported by the second upper frame 32*a* and the second lower frame 32*b*, and the roll shape of the deodorizing filter 36 may be maintained.

Figure 5:
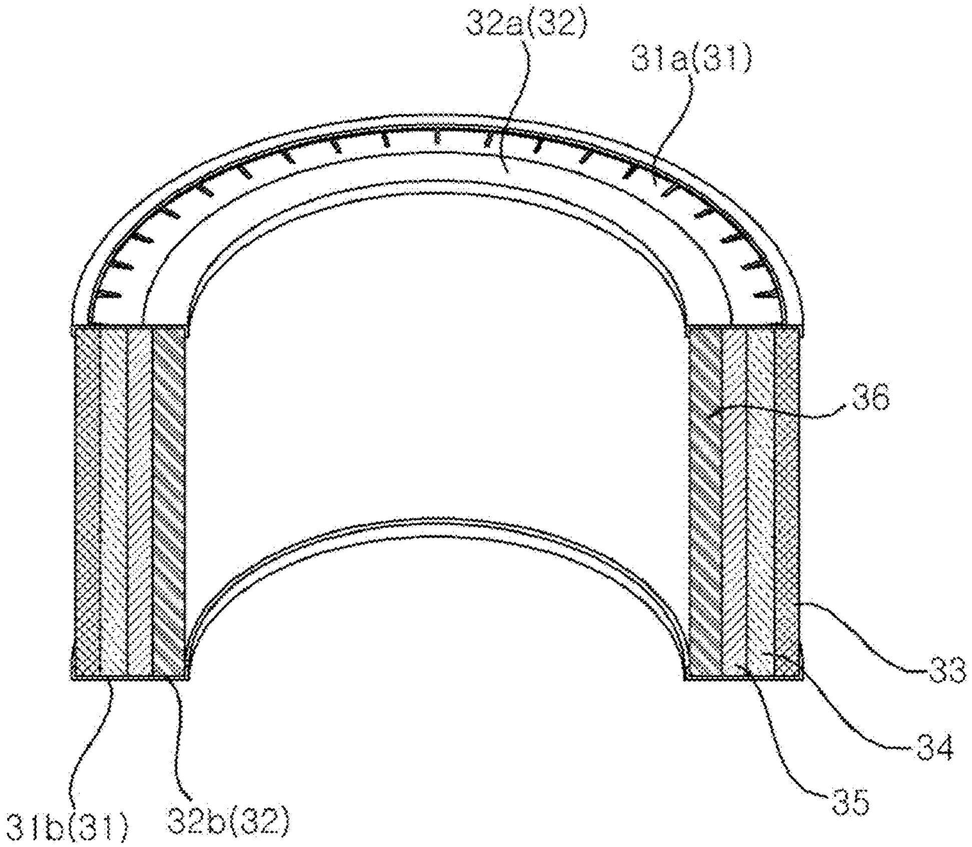
FIGS. 5 and 6 are views illustrating the filter according to the embodiment of the present disclosure.
Figure 6:
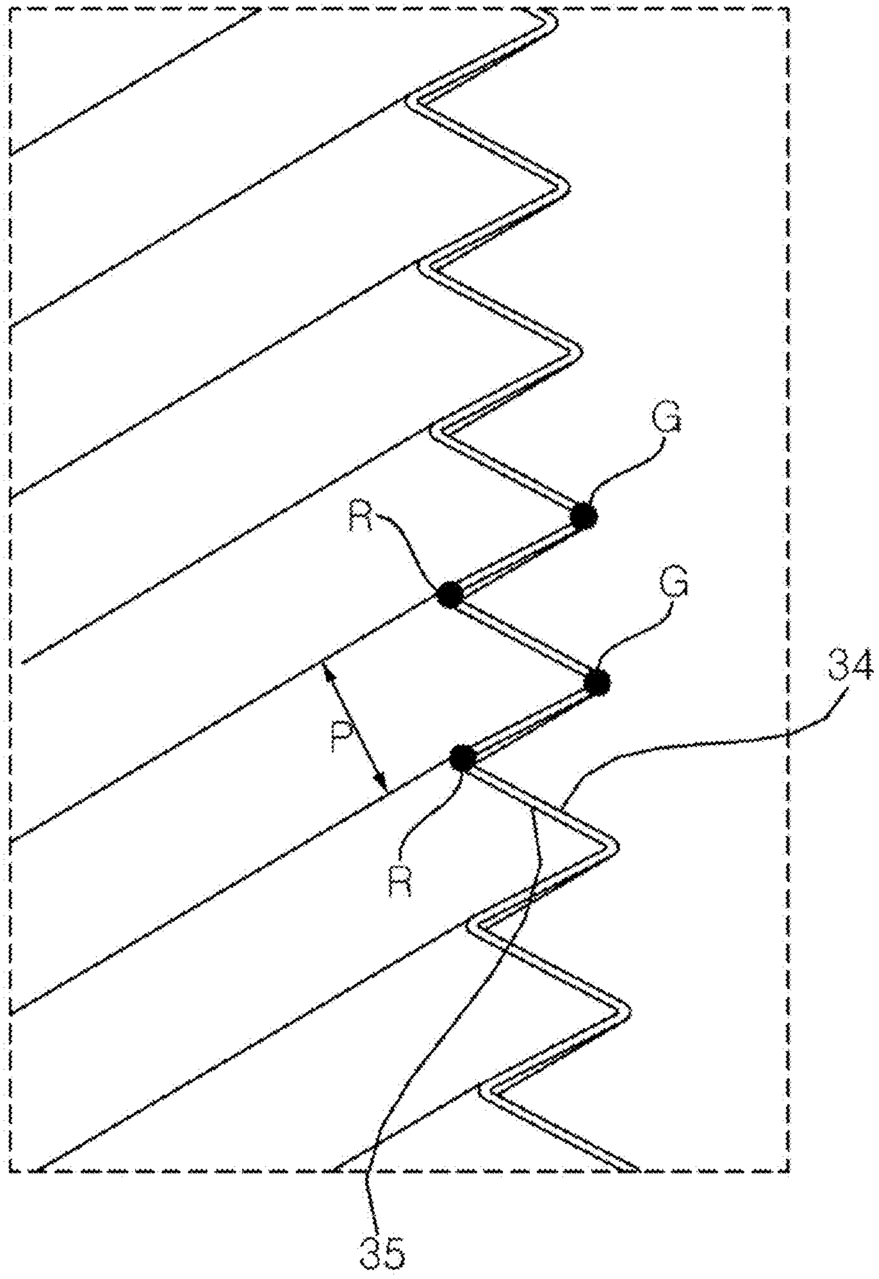

Referring to FIGS. 5 and 6, the prefilter 33, nanofiber filters 34 and 35, and the deodorizing filter 36 may be arranged between the upper frame 31*a*, 32*a* and the lower frame 31*b*, 32*b*, and may form layered filter layers.

The prefilter 33 may be located on the outermost part of the filter layers. The prefilter 33 may filter out animal hair, lint, hair, or large dust from the air. For example, the prefilter 33 may have a mesh structure and may have a plurality of holes formed therein. The prefilter 33 may be provided removably from the filter layers, and may be washed and reused as needed. For example, in the circumferential direction of the prefilter 33, the first end and second end of the prefilter 33 may be coupled to each other by Velcro.

The nanofiber filters 34 and 35 may be located inside the prefilter 33. The nanofiber filter 34 and 35 may be HEPA filters. Here, HEPA is an abbreviation for high efficiency particulate air. Each of the nanofiber filters 34 and 35 may filter out microscopic substances such as fine dust, bacteria, or viruses in the air.

Specifically, the nanofiber filters 34 and 35 may include a base 34 and a nanofiber 35. For example, the base 34 may be located outside the nanofiber 35. In this case, the base 34 may protect the nanofiber 35 from the outside. For another example, the base 34 may be located inside the nanofiber 35. In this case, the prefilter 33 may protect the nanofiber 35 from the outside.

The base 34 may be located between the first upper frame 31*a* and the first lower frame 31*b* and may be coupled to the first upper frame 31*a* and the first lower frame 31*b*. Accordingly, the base 34 may be supported by the first upper frame 31*a* and the first lower frame 31*b*, and the roll shape of the base 34 may be maintained.

The nanofiber 35 may be located between the first upper frame 31*a* and the first lower frame 31*b* and may be coupled to the base 34. Accordingly, the nanofiber 35 may be supported by the base 34, and the roll shape of the nanofiber 35 may be maintained.

The deodorizing filter 36 may be located inside the nanofiber filters 34 and 35. The deodorizing filter 36 may have a plurality of through holes. For example, the deodorizing filter 36 may be an activated carbon filter or a carbon filter, and may adsorb or collect unpleasant odors and/or harmful gases contained in air.

Figure 7:
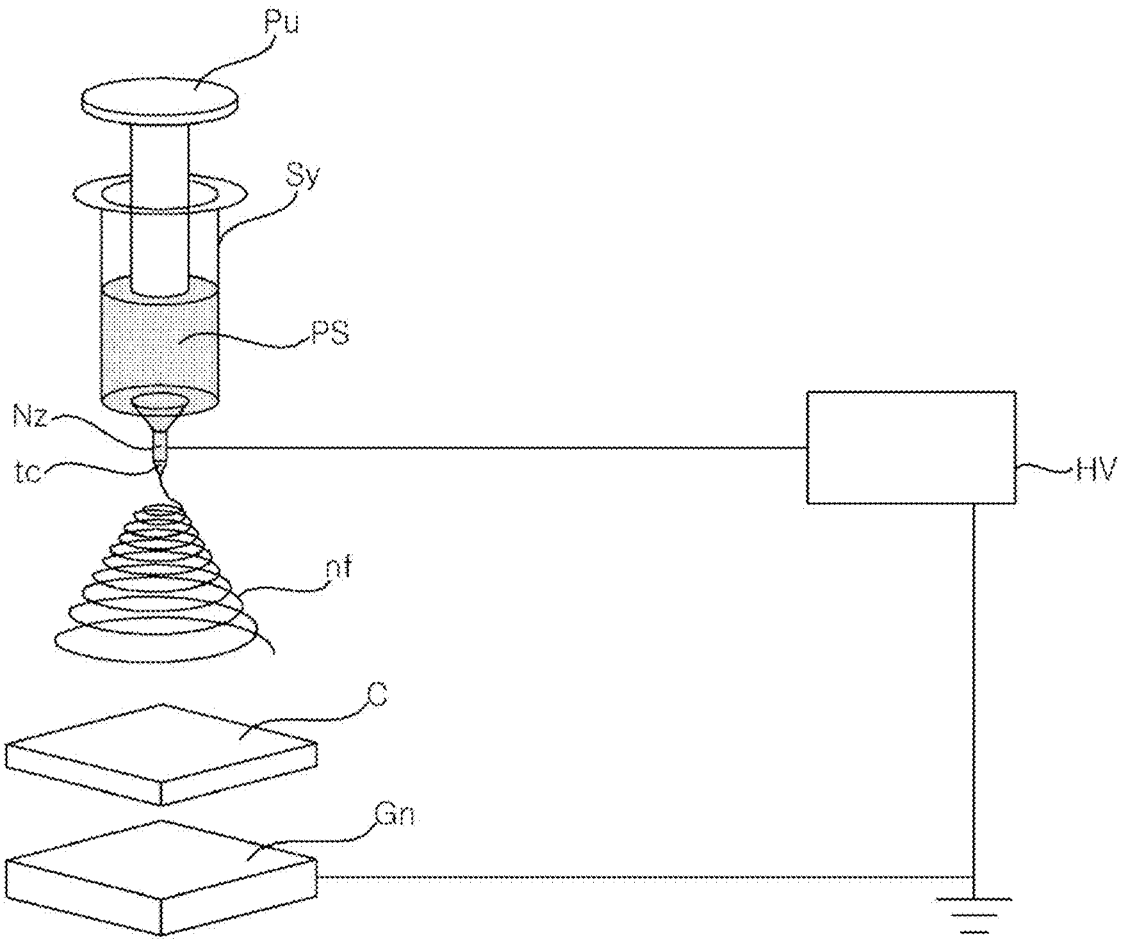
FIG. 7 is a perspective view of an electrospinning device for manufacturing a nanofiber filter according to the embodiment of the present disclosure.

Referring to FIGS. 6 and 7, each of the nanofiber filters 34 and 35 described above may be manufactured by electrospinning.

A polymer solution PS may be a raw material of a nanofiber. The polymer solution PS may include materials such as polyacrylonitrile (PAN), polyethersulfone (PES), polyamide (PA), or polyvinylidene fluoride (PVDF). The polymer solution (PS) accommodated in a syringe Sy may be pressed into a nozzle Nz provided on one side of the syringe Sy by a pump Pu. The nozzle Nz may be referred to as a needle. The polymer solution PS may be formed as a droplet at the tip of the nozzle Nz.

A high voltage source HV may apply a high voltage to the polymer solution PS. A voltage applied from the high voltage source HV to the nozzle Nz may be a high voltage of about 20 kV or more. When an electric field greater than the surface tension of the polymer solution PS is formed, the polymer solution PS as a nanofiber nf with a diameter of tens to hundreds of nanometers may be spun from the nozzle Nz toward a ground electrode Gn. In this case, a Taylor cone tc may be observed at the end of the nozzle Nz. The spun nanofiber nf may be attached and collected on a collector C placed between the nozzle Nz and the ground electrode Gn.

In this case, the collector C may be the base 34 described above, and the nanofiber nf may be the nanofiber 35 described above. The base 34 may be referred to as a support or substrate, and the nanofiber 35 stacked on the base 34 may be referred to as a nanofiber web. The base 34 as a dielectric may be a non-woven or woven fabric made of fiber. For example, the base 34 may include materials such as polypropylene (PP), polyethylene (PE), polyethylene terephthalate (PET), polyethersulfone (PES), or polyamide (PA), etc.

Meanwhile, contrary to the above, the base 34 may be conductive. That is, the base 34 may include a porous nonwoven or woven fabric made of fiber and a conductive material. In this case, the base 34 itself may function as the ground electrode.

The nanofiber filter manufactured by this electrospinning method may be affected by material properties such as the properties, molecular structure, viscosity, elasticity, dielectricity, polarity, and surface tension of the polymer solution, and spinning conditions such as the strength of an electric field, a distance between the nozzle and the collector, the supply speed of the polymer solution, and a temperature.

Figure 8:
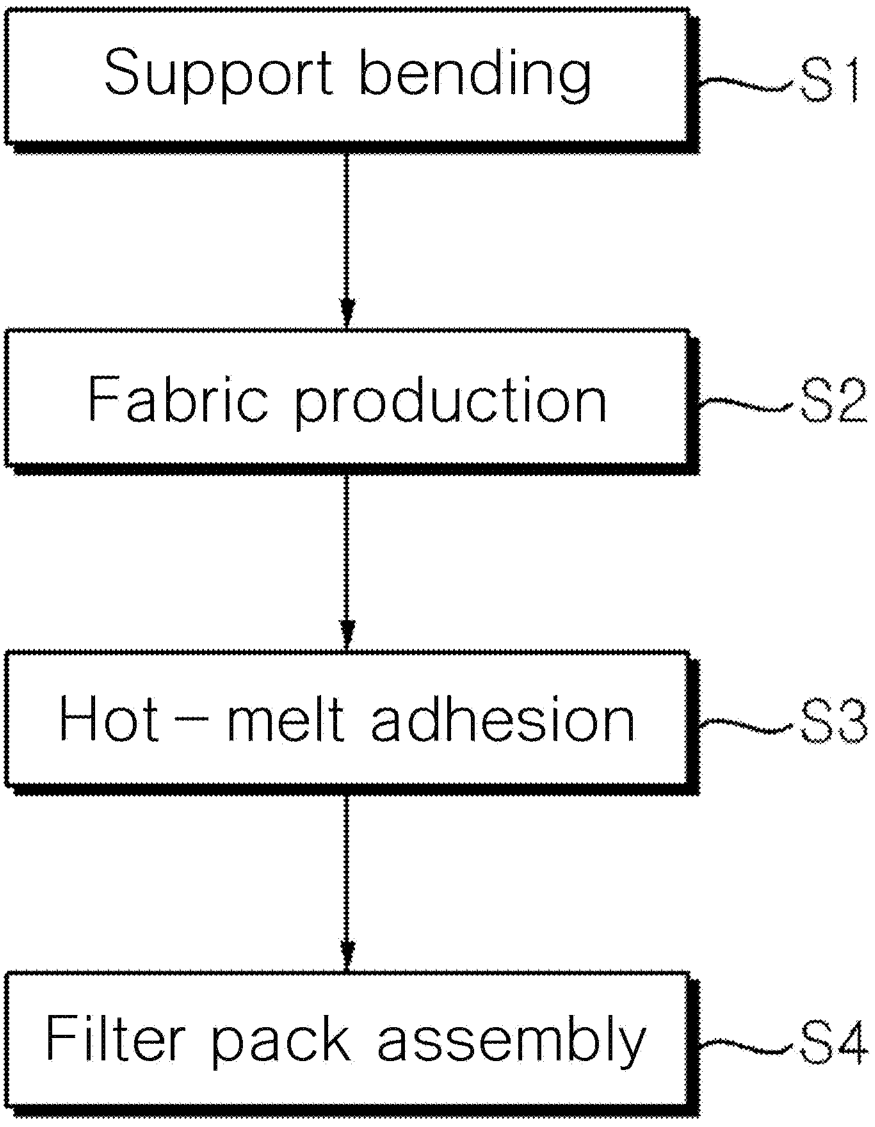
FIG. 8 is a flowchart of a method for manufacturing a nanofiber filter according to the embodiment of the present disclosure.

Referring to FIGS. 6 and 8, the nanofiber filter 34 or 35 may be pleated in the circumferential direction of the nanofiber filter 34 or 35. The cross section of the nanofiber filter 34 or 35 may have a repeated "V" shape. A distance between ridges R or grooves G of the nanofiber filter 34 or 35 may be P. Accordingly, the surface area of the nanofiber filter 34 or 35 may be increased, and the dust collection efficiency of the nanofiber filter 34 or 35 may be improved.

Figure 9:
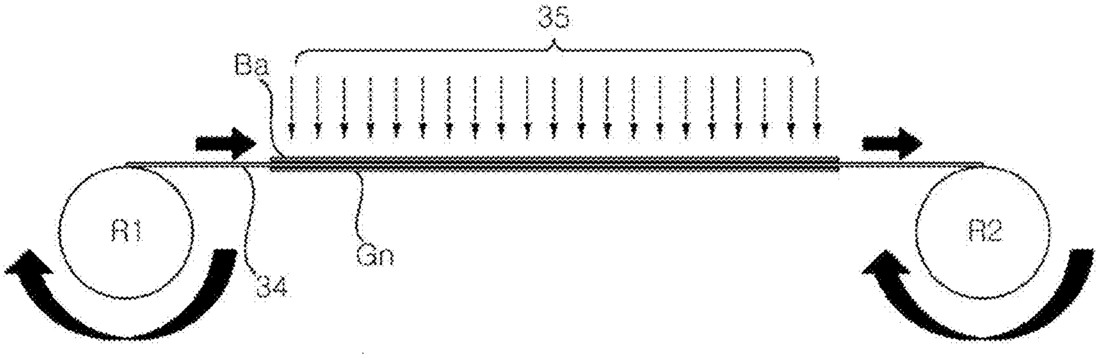
FIGS. 9 and 10 are views illustrating a structure and a method for flattening a base of the nanofiber filter according to the embodiment of the present disclosure.

Referring to FIGS. 8 and 9, the base 34, which is the support, may be bent into an upward "V" shape at S1. The first end of the base 34 may be fixed to a first roller R1, and the second end of the base 34 may be fixed to a second roller R2. The first roller R1 and the second roller R2 may rotate in the same directions (e.g. clockwise). The base 34 may be unwound from the first roller R1 and may be wound on the second roller R2. The pleats of the base 34 may be flattened between the first roller R1 and the second roller R2.

The ground electrode Gn may be located at the lower side of the base 34 between the first roller R1 and the second roller R2. The nanofiber 35 may be spun to the upper surface of the base 34 between the first roller R1 and the second roller R2.

In this case, compared to a case in which the nanofiber 35 is spun on the base 34 in a pleated state, the nanofiber 35 may be uniformly distributed on the base 34.

Figure 10:
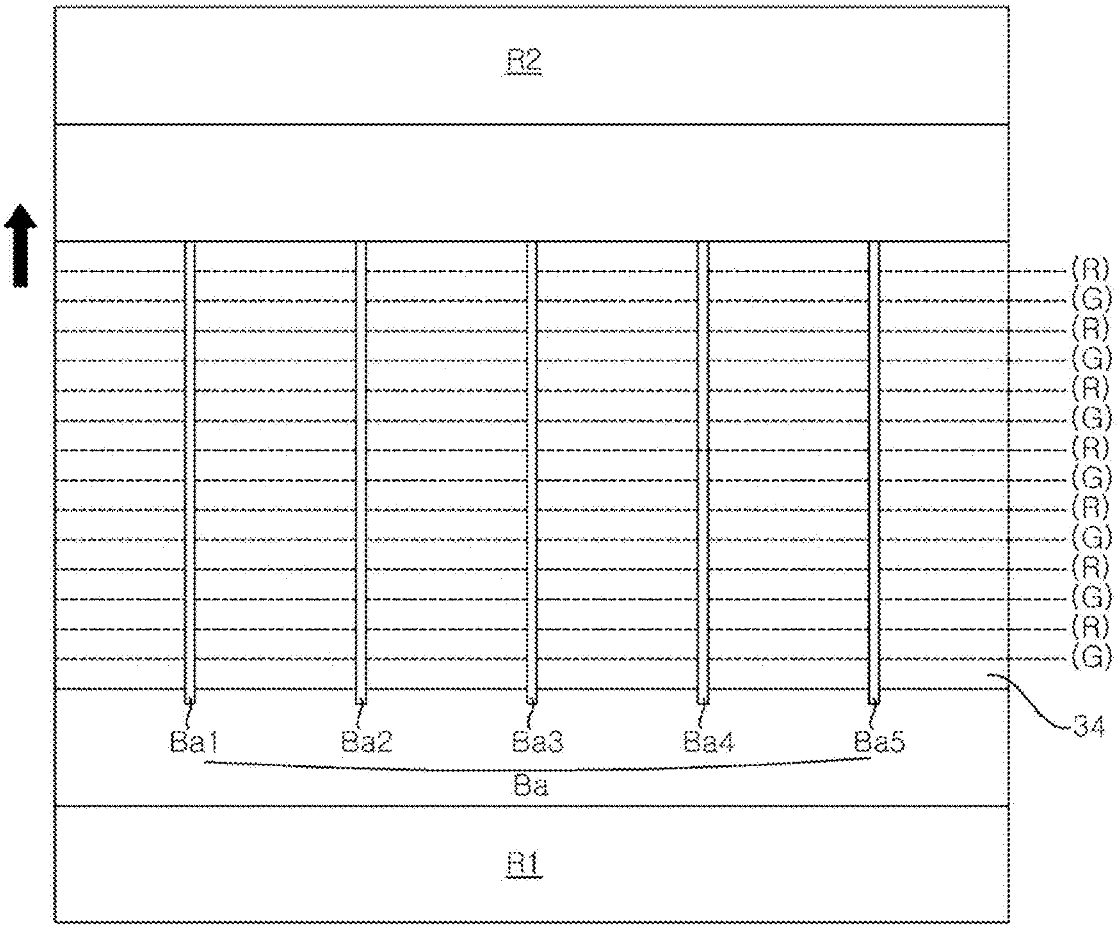

Referring to FIGS. 9 and 10, a plurality of bars Ba may be located between the first roller R1 and the second roller R2 and may be located (e.g.: closely attached) on the base 34. The positions of the plurality of bars Ba may be fixed. Each of the plurality of bars Ba may be a non-conductive material. The plurality of bars Ba may be opposite to the ground electrode Gn with respect to the base 34. The plurality of bars Ba1, Ba2, Ba3, Ba4, and Ba5 may extend long in directions in which the first roller R1 and the second roller R2 are spaced apart from each other, and may be spaced apart from each other in the longitudinal direction of each of the first roller R1 and the second roller R2. For example, the width of each of the bars Ba may be about 1 to 3 mm. For example, each of distances between the plurality of bars Ba may be about 30 to 50 mm.

Accordingly, the plurality of bars Ba1, Ba2, Ba3, Ba4, and Ba5 may press the ridges R of the base 34 which moves from the first roller R1 to the second roller R2 so that the ridges are flat. The nanofiber 35 may be distributed more uniformly on the base 34.

Meanwhile, the flatness of the base 34 may vary slightly depending on the positions of the plurality of bars Ba1, Ba2, Ba3, Ba4, and Ba5, but may be formed uniformly overall.

As a position is closer to a first bar Ba1 from the left side of the base 34, the degree of the flatness of the base 34 may increase. As a position is closer to a midpoint between the first bar Ba1 and a second bar Ba2 from the first bar Ba1, the degree of the flatness of the base 34 may decrease, and as a position is closer to the second bar Ba2 from the midpoint, the degree of the flatness of the base 34 may increase, but a difference therebetween may be less than a predetermined level. As a position is closer to a midpoint between the second bar Ba2 and a third bar Ba3 from the second bar Ba2, the degree of the flatness of the base 34 may decrease, and as a position is closer to the third bar Ba3 from the midpoint, the degree of the flatness of the base 34 may increase, but a difference therebetween may be less than a predetermined level.

As a position is closer to a midpoint between the third bar Ba3 and a fourth bar Ba4 from the third bar Ba3, the degree of the flatness of the base 34 may decrease, and as a position is closer to the fourth bar Ba4 from the midpoint, the degree of the flatness of the base 34 may increase, but a difference therebetween may be less than a predetermined level. As a position is closer to a midpoint between the fourth bar Ba4 and a fifth bar Ba5 from the fourth bar Ba4, the degree of the flatness of the base 34 may decrease, and as a position is closer to the fifth bar Ba5 from the midpoint, the degree of the flatness of the base 34 may increase, but a difference therebetween may be less than a predetermined level. As a position is closer to the right side of the base 34 from the fifth bar Ba5, the degree of the flatness of the base 34 may decrease.

Figure 11:
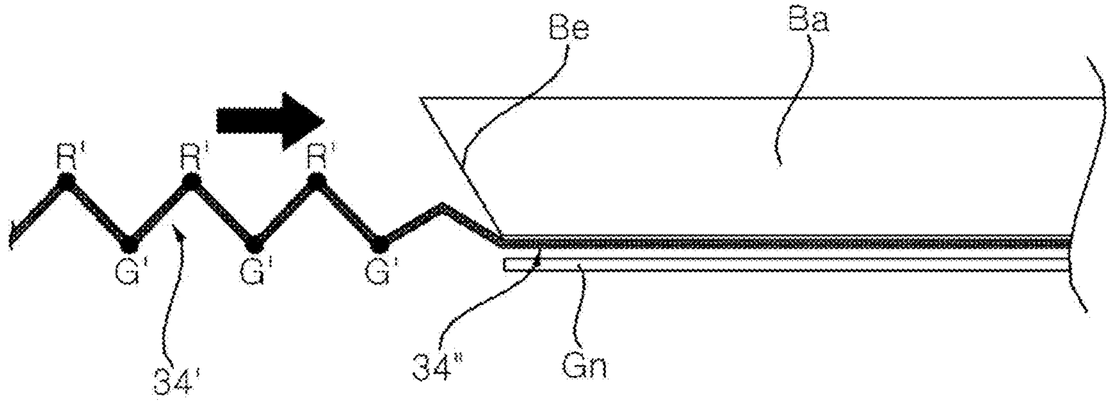
FIG. 11 is a view illustrating a structure for flattening the base of the nanofiber filter by a bar according to an example of the present disclosure.

Referring to FIG. 11, in the longitudinal direction of a bar Ba, an end Be of the bar Ba may face the first roller R1. The upper side of the bar Ba may be located closer to the first roller R1 than the lower side thereof. The end Be of the bar Ba may be formed to be inclined by having an obtuse angle with respect to the lower side of the bar Ba.

Accordingly, the ridges R' and grooves G' of a base 34', which are flattened to a predetermined level between the first roller R1 and the second roller R2, may efficiently pass through the lower side of the bar Ba through the end Be, and the base 34' may be provided as a base 34" in a flat state.

Meanwhile, according to the embodiment, it is also possible that the end Be of the bar Ba is formed perpendicular to the lower side of the bar Ba.

Figure 12:
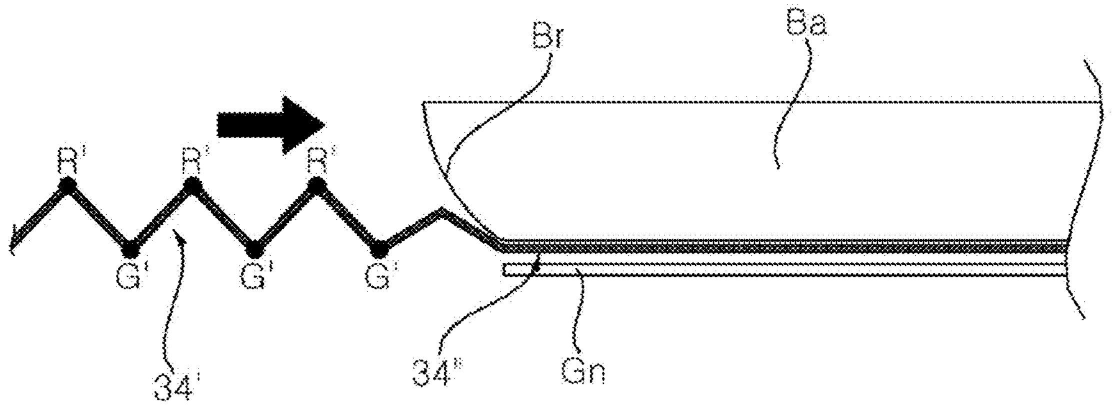
FIG. 12 is a view illustrating a structure for flattening the base of the nanofiber filter by a bar according to another example of the present disclosure.

Referring to FIG. 12, in the longitudinal direction of the bar Ba, an end Br of the bar Ba may face the first roller R1. The upper side the bar Ba may be located closer to the first roller R1 than the lower side thereof. The end Br of the bar Ba may be formed to be inclined by having an obtuse angle with respect to the lower side of the bar Ba or to be round.

Accordingly, the ridges R' and the grooves G' of the base 34', which are flattened to a predetermined level between the first roller R1 and the second roller R2, may efficiently pass through the lower side of the bar Ba through the end Br, and the base 34' may be provided as the base 34" in a flat state.

Figure 13:
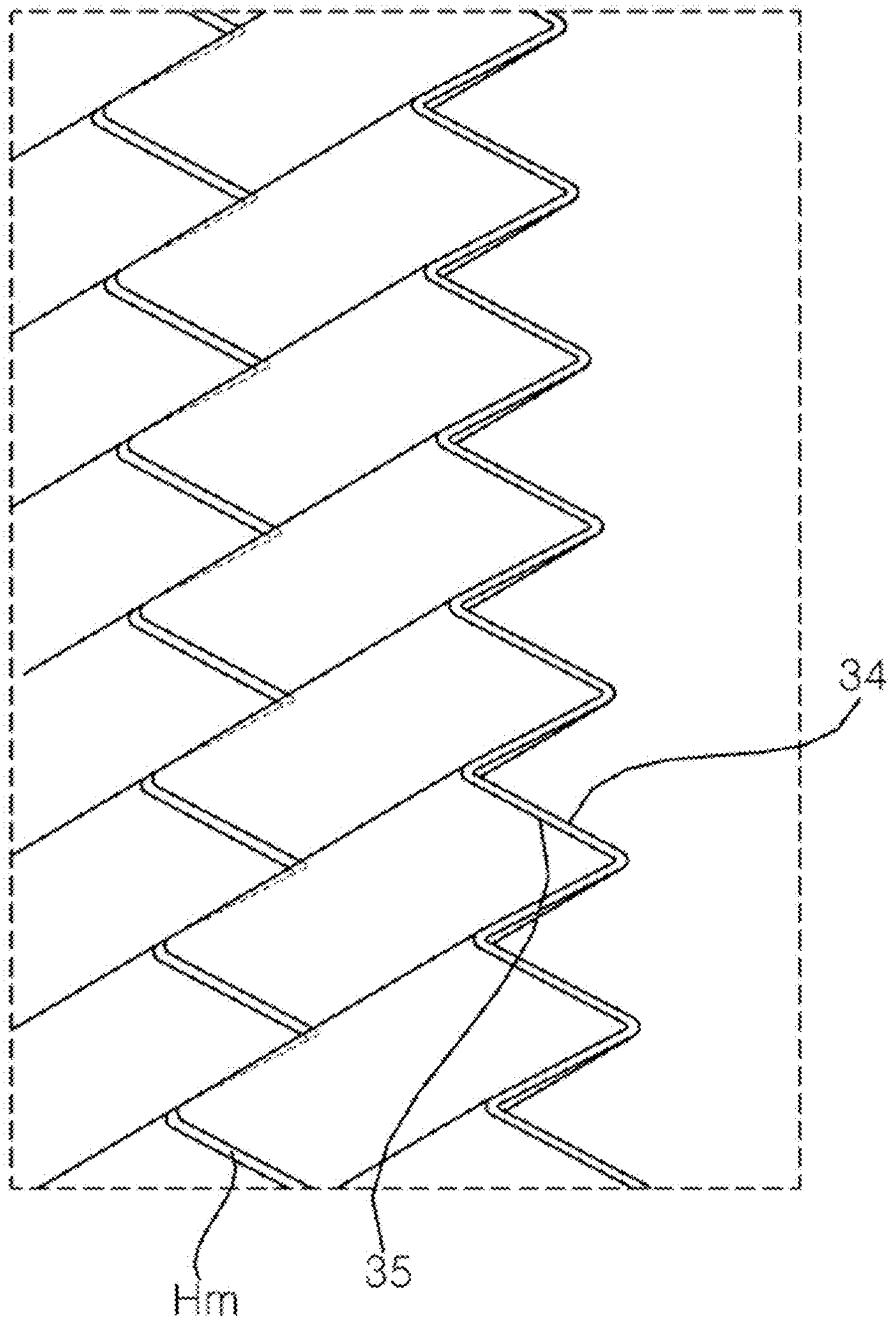
FIGS. 13 and 14 are views illustrating hot-melt adhesives for maintaining the pleated shapes of the nanofiber filter according to the embodiment of the present disclosure.

Referring to FIGS. 8 and 13, the nanofiber 35 may be located between the first roller R1 and the second roller R2 and may be attached on the base 34, and may be wound on the second roller R2. When the fabrics of the nanofiber filters 34 and 35 wound on the second roller R2 are unwound from the second roller R2 (i.e., applied tension is released), the fabrics may be pleated again into "V" shapes at S2. A user may cut each of the pleated fabrics of the pleated nanofiber filters 34 and 35 to a predetermined size.

Figure 14:
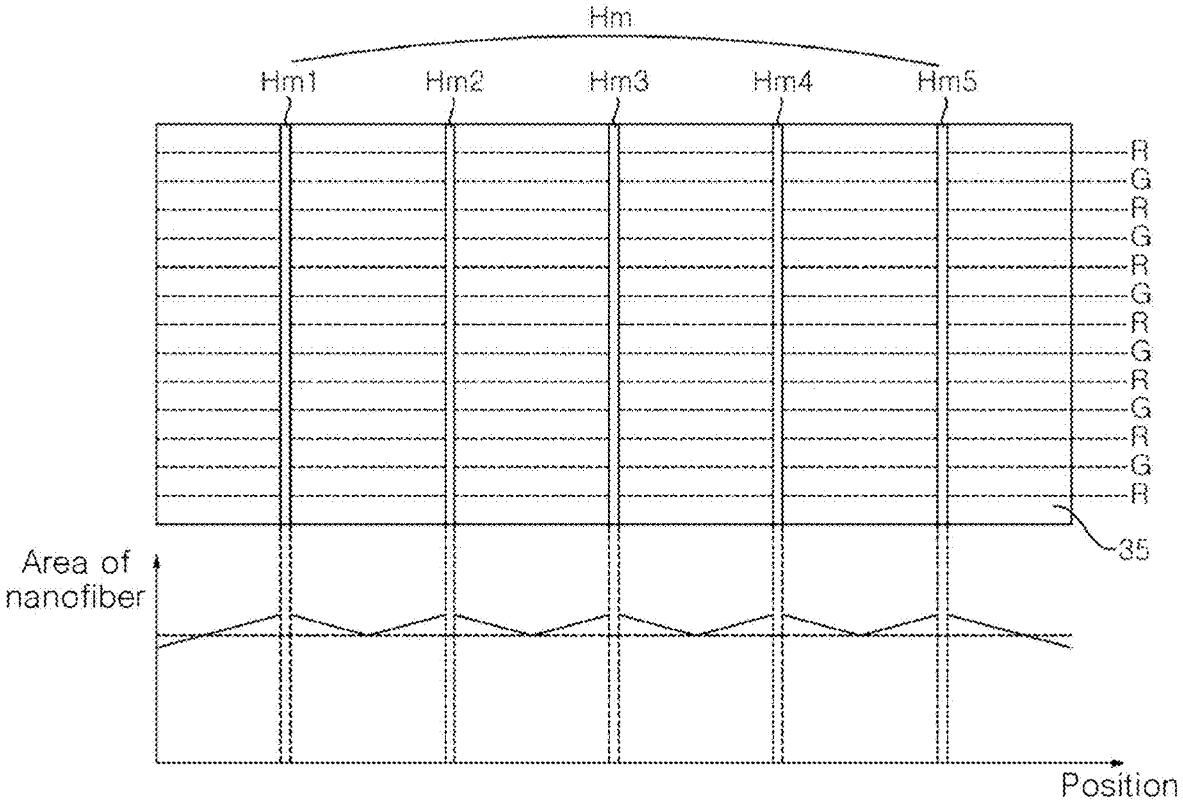

Referring to FIGS. 13 and 14, a plurality of hot-melt adhesives Hm may be attached on the nanofiber 35 at S3 (see FIG. 8). The plurality of hot-melt adhesives Hm may extend long in a direction in which the ridges R and the grooves G of the nanofiber 35 are formed alternately, and may be spaced apart from each other along the ridges R or the grooves G. The plurality of hot-melt adhesives Hm is able to maintain the pleated shapes of the nanofiber filters 34 and 35.

The plurality of hot-melt adhesives Hm may be attached on the plurality of bars Ba located on the base 34 before manufacturing the fabric. Accordingly, the area of the nanofiber 35 attached on the base 34 may be maximized.

Meanwhile, the area occupied by the nanofiber 35 may vary slightly depending on a position on each of the nanofiber filters 34 and 35, but may be formed uniformly overall.

As a position is closer to a first hot-melt adhesive Hm1 from the left side of the nanofiber filter 34 or 35, the area of the nanofiber 35 may increase. As a position is closer to a midpoint between the first hot-melt adhesive Hm1 and a second hot-melt adhesive Hm2 from the first hot-melt adhesive Hm1, the area of the nanofiber 35 may decrease, and as a position is closer to the second hot-melt adhesive Hm2 from the midpoint, the area of the nanofiber 35 may increase, but a difference therebetween may be less than a predetermined level. As a position is closer to a midpoint between the second hot-melt adhesive Hm2 and a third hot-melt adhesive Hm3 from the second hot-melt adhesive Hm2, the area of the nanofiber 35 may decrease, and as a position is closer to the third hot-melt adhesive Hm4 from the midpoint, the area of the nanofiber 35 may increase, but a difference therebetween may be less than a predetermined level.

As a position is closer to a midpoint between the third hot-melt adhesive Hm3 and a fourth hot-melt adhesive Hm4 from the third hot-melt adhesive Hm3, the area of the nanofiber 35 may decrease, and as a position is closer to the fourth hot-melt adhesive Hm4 from the midpoint, the area of the nanofiber 35 may increase, but a difference therebetween may be less than a predetermined level. As a position is closer to a midpoint between the fourth hot-melt adhesive Hm4 and a fifth hot-melt adhesive Hm5 from the fourth hot-melt adhesive Hm4, the area of the nanofiber 35 may decrease, and as a position is closer to the fifth hot-melt adhesive Hm5 from the midpoint, the area of the nanofiber 35 may increase, a difference therebetween may be less than a predetermined level. As a position is closer to the right side of the nanofiber filter 34 or 35 from the fifth hot-melt adhesive Hm5, the area of the nanofiber 35 may decrease.

Referring to FIGS. 1 to 14, the nanofiber filter may include: the base having a pleated shape; and the nanofiber attached on the base by electrospinning, wherein the nanofiber may be attached on the base while the base having the pleated shape is in a flattened state.

Each of the pleated shapes of the base and the nanofiber may include ridges and grooves that alternate at regular intervals.

The nanofiber filter may further include the plurality of hot-melt adhesives attached on the nanofiber, wherein the plurality of hot-melt adhesives may extend long in the direction in which the ridges and the grooves are formed alternately, and may be spaced apart from each other along the ridges or the grooves.

A raw material of the nanofiber may include PAN, PES, PA, or PVDF, and the base as a non-woven or woven fabric made of fiber may include PP, PE, PET, PES, or PA.

The method for manufacturing a nanofiber filter may include: (a) forming pleats on the base; (b) flattening the pleated base by applying tension to the pleated base; (c) attaching the nanofiber on the flattened base by electrospinning; and (d) releasing the tension applied to the flattened base.

The flattening (b) may include: (b1) fixing a first end of the pleated base to the first roller, and fixing a second end of the pleated base to the second roller; and (b2) rotating the first roller and the second roller in the same directions.

The flattening (b) may further include: (b3) locating the plurality of bars on the base between the first roller and the second roller.

The plurality of bars may extend in directions in which the first roller and the second roller are spaced apart from each other, and may be spaced apart from each other in the longitudinal direction of each of the first roller and the second roller.

An end of each of the plurality of bars may face the first roller and may be formed to be inclined by having an obtuse angle with respect to the lower side of the bar.

An end of each of the plurality of bars may be round.

The attaching (c) may include (c1) applying a high voltage to the syringe accommodating the polymer solution, which is the raw material of the nanofiber, wherein the ground electrode for the syringe may be opposite to the plurality of bars with respect to the base between the first roller and the second roller.

The plurality of bars may be non-conductive objects.

The method for manufacturing a nanofiber filter may further include: (e) attaching the plurality of hot-melt adhesives on the positions of the plurality of bars, respectively, after the releasing (d).

Some embodiments or other embodiments of the present disclosure described above are not exclusive or distinct from each other. In the some embodiments or the other embodiments of the present disclosure described above, configurations or functions thereof may be mixed or combined.

For example, this means that configuration A described in a particular embodiment and/or drawing may be combined with configuration B described in another embodiment and/or drawing. In other words, even if combination between components is not directly explained, it means that the combination is possible, except in cases in which it is explained that the combination is impossible.

The above detailed description should not be construed as restrictive in any respect and should be considered illustrative. The scope of the present disclosure should be determined by reasonable interpretation of the appended claims, and all changes within the equivalent scope of the present disclosure are included in the scope of the present disclosure.

The invention claimed is:

1. A nanofiber filter comprising:
- a base having a pleated shape; and
- a nanofiber attached to the base by electrospinning, the nanofiber being attached to the base while the base having the pleated shape is in a flattened state.

2. The nanofiber filter of claim 1, wherein each of the pleated shape of the base and a pleated shape of the nanofiber comprises ridges and grooves that alternate at regular intervals.

3. The nanofiber filter of claim 2, further comprising a plurality of hot-melt adhesives attached to the nanofiber,
- wherein the plurality of hot-melt adhesives extend in a direction in which the ridges and the grooves are formed alternately, the plurality of hot-melt adhesives being spaced apart from each other along the ridges or the grooves.

4. The nanofiber filter of claim 1, wherein a raw material of the nanofiber includes one of polyacrylonitrile (PAN), polyethersulfone (PES), polyamide (PA), or polyvinylidene fluoride (PVDF), and
- wherein the base is a non-woven or woven fabric made of fiber including one of polypropylene (PP), polyethylene (PE), polyethylene terephthalate (PET), PES, or PA.

5. An air filter comprising:
- a casing having a plurality of suction holes and a discharge hole;
- the nanofiber filter of claim 1 located in the casing; and
- a fan module located in the casing, the fan module being configured to draw air through the plurality of suction holes and the nanofiber filter, and to discharge filtered air through the discharge hole.

6. A method for manufacturing a nanofiber filter, the method comprising:
- forming pleats on a base to form a pleated base;
- temporarily flattening the pleated base to provide a flattened base;
- attaching a nanofiber on the flattened base by electrospinning; and
- releasing the flattened base after attaching the nanofiber.

7. The method of claim 6, wherein temporarily flattening the pleated base includes applying tension to the pleated base.

8. The method of claim 7, wherein applying tension to the pleated base includes:
- fixing a first end of the pleated base to a first roller;
- fixing a second end of the pleated base to a second roller spaced apart from the first roller; and
- rotating the first roller and the second roller in a same direction.

9. The method of claim 8, wherein the temporarily flattening the pleated base further includes placing a plurality of bars on the base between the first roller and the second roller.

10. The method of claim 9, wherein the plurality of bars extend in a direction in which the first roller and the second roller are spaced apart from each other, and
- wherein the plurality of bars are spaced apart from each other in a longitudinal direction of each of the first roller and the second roller.

11. The method of claim 10, wherein a first end of each of the plurality of bars faces the first roller, the first end being inclined at an obtuse angle with respect to a lower side of the bar.

12. The method of claim 10, wherein a first end of each of the plurality of bars faces the first roller, a lower side of the first end being rounded.

13. The method of claim 10, wherein each of the plurality of bars is a non-conductive member.

14. The method of claim 9, wherein the attaching the nanofiber on the flattened base by electrospinning includes applying a high voltage to a syringe accommodating a polymer solution, the polymer solution being a raw material of the nanofiber,
- wherein a ground electrode for the syringe is located on a first side of the base between the first roller and the second roller, the base being located between the syringe and the ground electrode, and
- wherein the plurality of bars are located on a second side of the base opposite the first side.

15. The method of claim 9, further comprising attaching a plurality of hot-melt adhesives to the nanofiber filter to positions corresponding to the plurality of bars, respectively, after releasing the flattened base.

* * * * *